United States Patent
Urano et al.

(10) Patent No.: US 7,391,677 B2
(45) Date of Patent: Jun. 24, 2008

(54) POSITIONING DEVICE, POSITIONING METHOD, AND TIMEPIECE HAVING THE POSITIONING DEVICE

(75) Inventors: Osamu Urano, Nagano-ken (JP);
Teruhiko Fujisawa, Nagano-ken (JP);
Katsuyuki Honda, Nagano-ken (JP);
Jun Matsuzaki, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/777,884

(22) Filed: Jul. 13, 2007

(65) Prior Publication Data
US 2008/0025151 A1     Jan. 31, 2008

(30) Foreign Application Priority Data
Jul. 31, 2006     (JP)     ............. 2006-208594

(51) Int. Cl.
G04C 11/02     (2006.01)
H04B 7/19     (2006.01)
H04B 7/185     (2006.01)
G01S 1/00     (2006.01)

(52) U.S. Cl. .............. 368/47; 342/356; 342/357.06; 455/12.1

(58) Field of Classification Search ............ 368/10, 368/46, 47; 342/356, 357.01, 357.06; 455/12.1, 455/13.1, 13.2
See application file for complete search history.

(56) References Cited

U.S. PATENT DOCUMENTS

| 4,287,597 | A | * | 9/1981 | Paynter et al. | ............. 455/12.1 |
| 4,823,328 | A | * | 4/1989 | Conklin et al. | ............. 368/47 |
| 5,408,444 | A | * | 4/1995 | Kita et al. | ............. 368/47 |
| 5,771,001 | A | * | 6/1998 | Cobb | ............. 340/573.1 |
| 5,860,056 | A | * | 1/1999 | Pond | ............. 455/13.3 |
| 2005/0275587 | A1 | | 12/2005 | Siegel et al. | |
| 2006/0071852 | A1 | * | 4/2006 | Akano | ............. 342/386 |

(Continued)

FOREIGN PATENT DOCUMENTS

DE     4202435 A1     8/1993

(Continued)

OTHER PUBLICATIONS

Lewandowski, W., et al., "GPS Time Transfer," Proceedings of the IEEE, New York, US, vol. 79, No. 7, Jul. 1, 1991, pp. 991-1000.

*Primary Examiner*—Vit W Miska

(57) ABSTRACT

A positioning device has a reception unit for receiving navigation messages transmitted continuously in a time series from positioning information satellites orbiting the Earth and determines the location of the positioning device based on the navigation messages received by the transmission unit. Each navigation message is segmented into a plurality of data transmission blocks that are transmitted sequentially, a portion of the data transmission blocks carry almanac data containing orbital information for all positioning information satellites including the positioning information satellite transmitting the received navigation message, and the data transmission blocks carrying the almanac data are transmitted non-contiguously. The positioning device also has signal discrimination unit for identifying the start of receiving a data transmission block containing the non-contiguously transmitted almanac data, and identifying the end of receiving the data transmission block containing the almanac data. The reception unit intermittently receives the signals of the data transmission blocks containing the almanac data by receiving the navigation messages in the reception time of the data transmission blocks containing the almanac data identified by the signal discrimination unit.

6 Claims, 13 Drawing Sheets

U.S. PATENT DOCUMENTS

2006/0208942 A1  9/2006  Vyas et al.

FOREIGN PATENT DOCUMENTS

| | | |
|---|---|---|
| DE | 19821320 A1 | 12/1998 |
| EP | 1014235 A2 | 6/2000 |
| FR | 2863814 | 6/2005 |
| JP | 1010251 | 1/1998 |
| JP | 1082875 | 3/1998 |
| JP | 11237462 | 8/1999 |
| JP | 2001059864 | 3/2001 |
| WO | 9527927 A1 | 10/1995 |

* cited by examiner

POSITIONING DEVICE, POSITIONING METHOD, AND TIMEPIECE HAVING THE POSITIONING DEVICE

CROSS-REFERENCE TO RELATED APPLICATIONS

Japanese Patent application No. 2006-208594 is hereby incorporated by reference in its entirety.

BACKGROUND

1. Field of Invention

The present invention relates to a positioning device that determines its own position, to a positioning method, and to a timepiece having the positioning device.

2. Description of the Related Art

GPS (global positioning system) receivers are positioning devices that use signals from orbiting satellites to determine the position of the GPS receiver (device).

GPS devices receive signals from four or more GPS satellites to determine the position of the GPS device. More specifically, the GPS device selects four or more GPS satellites from among the constellation of GPS satellites orbiting the Earth and receives signals from the selected GPS satellites to determine the position of the GPS device.

The signals from the GPS satellites include orbital information describing the precise orbit of and information about the status of the GPS satellite that is transmitting the signal (called "ephemeris"), and information about the orbits of all GPS satellites in the constellation (called the "almanac"). The ephemeris and almanac are transmitted in a "navigation message."

The same almanac is transmitted by all of the GPS satellites and is transmitted in segments due to the large amount of transmitted data. More specifically, as shown in FIG. 12, the navigation message is transmitted in one frame containing five subframes. The first three subframes contain clock correction data and high accuracy ephemeris, that is, the detailed orbital information describing the precise orbit and status of the GPS satellite transmitting the signal, and subframes 4 and 5 contain the almanac, that is, the information about the orbits of all GPS satellites. The almanac is further divided into pages 1 to 25. The almanac pages are sequentially transmitted in subframe 4 and subframe 5 until all of the information for one navigation message has been transmitted.

A Coarse/Acquisition (C/A) code composed of 1023 chips with a value of 1 or 0 is transmitted every 1 ms on a 1574.2 Hz carrier wave from the GPS satellite, and is transmitted superimposed with the navigation message. A unique C/A code is assigned to each GPS satellite, and the C/A code enables the GPS receiver to identify which GPS satellite transmitted the data.

The GPS receiver generates a signal of the same content as the C/A code assigned to each GPS satellite to synchronize with the signal from the GPS satellite and measure the transmission time from each GPS satellite while demodulating the navigation message from each GPS satellite to acquire the data from the GPS satellites.

It takes 30 seconds to transmit one complete frame of the navigation message, and it therefore takes 12.5 minutes to acquire all 25 pages of the almanac. A problem with this is that continuously receiving the GPS signals increases power consumption by the GPS receiver and the power supply of the GPS receiver therefore does not last long.

To solve this problem, Japanese Patent 3744180 (JP11-237462) (paragraph [0011]) teaches a GPS receiver that reduces power consumption by setting a time once a day to receive a certain subset of non-consecutive almanac pages at a 30 second delay and rewrite the internally stored data with the data transmitted from the GPS satellite over a number of reception cycles spanning plural days.

As shown in FIG. 13, however, if the GPS receiver taught in Japanese Patent 3744180 receives one set of almanac pages one day and the user travels a significant distance to a different location before the GPS receiver receives the rest of the almanac pages the next day, the almanac data received before traveling may be rendered invalid. This makes it difficult to use this GPS receiver in devices, such as timepieces, that may travel great distances in a short period of time.

SUMMARY OF THE INVENTION

Instead of receiving the almanac pages in parcels over plural days, the positioning device, positioning method, and timepiece having the positioning device of the present invention enable continuously receiving all pages of the almanac containing orbital information for all positioning satellites in the constellation while still reducing power consumption.

A first aspect of the invention is a positioning device that has a reception unit for receiving navigation messages transmitted continuously in a time series from positioning information satellites orbiting the Earth and determines the location of the positioning device based on the navigation messages received by the transmission unit. Each navigation message is segmented into a plurality of data transmission blocks that are transmitted sequentially, a portion of the data transmission blocks carry almanac data containing orbital information for all positioning information satellites including the positioning information satellite transmitting the received navigation message, and the data transmission blocks carrying the almanac data are transmitted non-contiguously. The positioning device has a signal discrimination unit for identifying the start of receiving a data transmission block containing the non-contiguously transmitted almanac data, and identifying the end of receiving the data transmission block containing the almanac data. The reception unit intermittently receives the signals of the data transmission blocks containing the almanac data by receiving the navigation messages in the reception time of the data transmission blocks containing the almanac data identified by the signal discrimination unit.

The navigation messages transmitted continuously in a time series from positioning information satellites are segmented into a plurality of data transmission blocks that are transmitted sequentially, and the data transmission blocks carrying the almanac data are transmitted non-contiguously. A signal discrimination unit identifies the start of receiving a data transmission block containing the non-contiguously transmitted almanac data, and identifies the end of receiving the data transmission block containing the almanac data. The reception unit intermittently receives the signals of the data transmission blocks containing the almanac data by receiving the navigation messages during the reception time of the data transmission blocks containing the almanac data identified by the signal discrimination unit.

Because the reception unit selectively receives the signals of the data transmission blocks containing the almanac data, the reception unit does not need to remain constantly in the reception state when receiving the navigation message, and thereby reduces power consumption by the positioning device. In addition, the positioning device can also sequentially receive all of the plural data transmission blocks in the navigation messages transmitted in a time series from the positioning information satellites.

Preferably, the signal discrimination unit detects the transmission time of the data transmission block based on a sign signal generated synchronized to the C/A code that is unique to the positioning information satellite, and identifies the reception start time of a data transmission block containing the almanac data and the reception end time of the data transmission block containing the almanac data based on the sign signal timed to the transmission time.

This aspect of the invention detects the transmission time of the data transmission block based on a sign signal generated synchronized to the C/A code that is unique to the positioning information satellite, and identifies the reception start time of a data transmission block containing the almanac data and the reception end time of the data transmission block containing the almanac data based on the sign signal timed to the transmission time.

In other words, this aspect of the invention can accurately identify when reception of a data transmission block containing the almanac data starts and when reception of the data transmission block containing the almanac data ends, and can get highly precise information, by means of a sign signal that is synchronized to the C/A code that is unique to the positioning information satellite.

In another aspect of the invention the plurality of data transmission blocks is five subframes; and the signal discrimination unit has a control signal unit that outputs a control signal for getting a synchronization signal synchronized to preamble data and TOW data contained in each subframe, and asynchronously acquiring two subframes containing the almanac data based on the sign signal.

In this aspect of the invention the signal discrimination unit has a control signal unit that outputs a control signal for getting a synchronization signal synchronized to preamble data and TOW data contained in the five subframes asynchronously to the two subframes containing the almanac data that are acquired based on the sign signal.

This aspect of the invention efficiently captures the two subframes containing the almanac data carried in the navigation messages that are consecutively transmitted in a time series from the positioning satellites.

In another aspect of the invention the five subframes constitute one frame; and the signal discrimination unit has a counter that, based on the sign signal and the synchronization signal, detects the end of the fifth subframe, which contains almanac data, in a frame, detects the timing of three subframes and two subframes using the sign signal, and outputs a counter signal at this timing; and a signal generating unit that inverts the control signal output from the control signal unit and outputs the inverted control signal, and generates a signal acquired by comparing the inverted control signal and the counter signal.

In this aspect of the invention the signal discrimination unit has a counter that detects the end of the fifth subframe, which contains almanac data, of a frame, detects the timing of three subframes and two subframes based on the sign signal and the synchronization signal, and outputs a counter signal at this timing; and a signal generating unit that inverts the control signal output from the control signal unit and outputs the inverted control signal, and generates a signal acquired by comparing the inverted control signal and the counter signal.

The signal generating unit in this aspect of the invention generates a signal by comparing the inverted control signal and the counter signal, thereby more precisely acquiring the timing for intermittent reception by the reception unit, and efficiently reducing power consumption.

Another aspect of the invention is a positioning method that has a reception unit for receiving navigation messages transmitted continuously in a time series from positioning information satellites orbiting the Earth and determines the location of the positioning device based on the navigation messages received by the transmission unit. Each navigation message is segmented into a plurality of data transmission blocks that are transmitted sequentially, a portion of the data transmission blocks carry almanac data containing orbital information for all positioning information satellites including the positioning information satellite transmitting the received navigation message, and the data transmission blocks carrying the almanac data are transmitted non-contiguously. The positioning method has a signal discrimination unit for identifying the start of receiving a data transmission block containing the non-contiguously transmitted almanac data, and identifying the end of receiving the data transmission block containing the almanac data; and the reception unit intermittently receives the signals of the data transmission blocks containing the almanac data by receiving the navigation messages in the reception time of the data transmission blocks containing the almanac data identified by the signal discrimination unit.

Another aspect of the invention is a timepiece having a positioning device that has a reception unit for receiving navigation messages transmitted continuously in a time series from positioning information satellites orbiting the Earth and determines the location of the positioning device based on the navigation messages received by the transmission unit. Each navigation message is segmented into a plurality of data transmission blocks that are transmitted sequentially, a portion of the data transmission blocks carry almanac data containing orbital information for all positioning information satellites including the positioning information satellite transmitting the received navigation message, and the data transmission blocks carrying the almanac data are transmitted non-contiguously. The timepiece positioning device has a signal discrimination unit for identifying the start of receiving a data transmission block containing the non-contiguously transmitted almanac data, and identifying the end of receiving the data transmission block containing the almanac data. The reception unit intermittently receives the signals of the data transmission blocks containing the almanac data by receiving the navigation messages in the reception time of the data transmission blocks containing the almanac data identified by the signal discrimination unit.

The invention can reduce power consumption in a small device such as a timepiece that requires low power consumption and could move long distances in a short period of time, and enables receiving almanac data containing orbital information about all of the positioning information satellites continuously after first receiving the navigation message.

Other objects and attainments together with a fuller understanding of the invention will become apparent and appreciated by referring to the following description and claims taken in conjunction with the accompanying drawings.

DESCRIPTION OF THE PREFERRED EMBODIMENTS

Preferred embodiments of the present invention are described below with reference to the accompanying figures.

The embodiments described below are specific desirable examples of the invention and technically desirable limitations are described, but the scope of the invention is not limited to these embodiments except as may be specifically described below.

Figure 1:
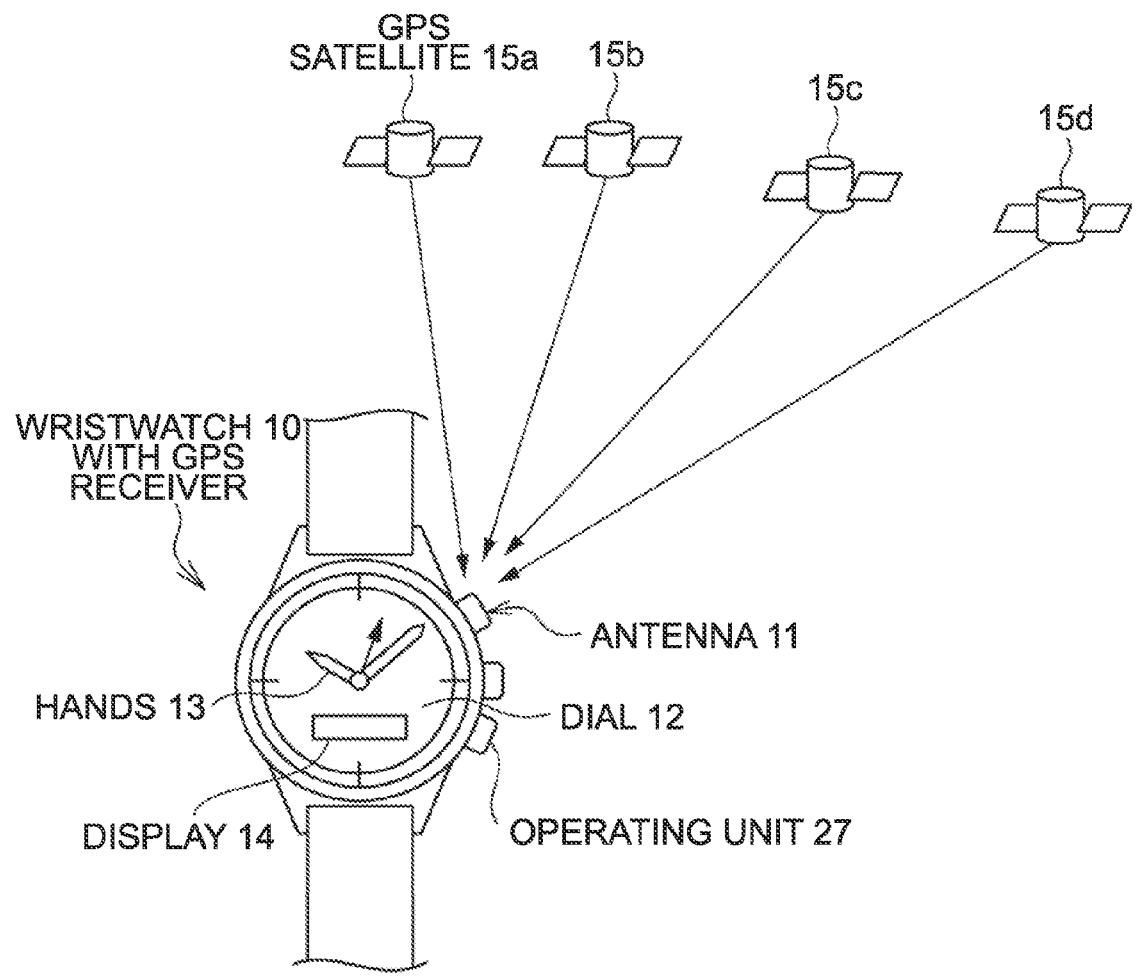
FIG. 1 shows a wristwatch with a GPS receiver as an example of a timepiece having a GPS receiver according to the present invention.
Figure 2:
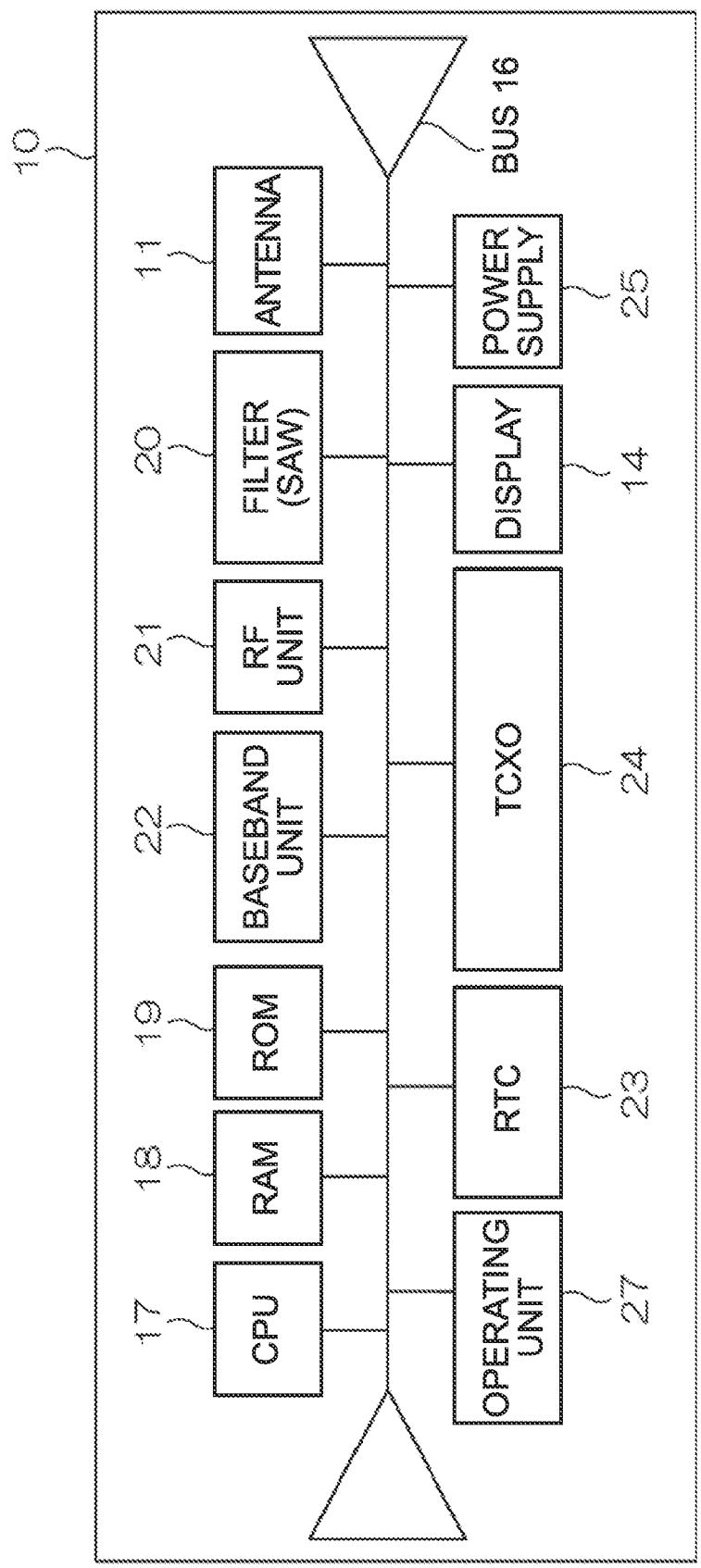
FIG. 2 is a block diagram showing the internal hardware configuration of the GPS wristwatch shown in FIG. 1.

FIG. 1 shows a timepiece having a positioning device according to the invention. FIG. 1 schematically describes a wristwatch 10 with a GPS receiver (referred to below as a GPS wristwatch 10), and FIG. 2 is a block diagram showing the internal hardware configuration of the GPS wristwatch 10 shown in FIG. 1.

As shown in FIG. 1 this GPS wristwatch 10 has a dial 12 with long and short hands 13 on the front, a display 14 such as an LCD module for displaying information, and an operating unit 27 used for manual operations by the user.

As shown in FIG. 1 the GPS wristwatch 10 has an antenna 11, and the antenna 11 is used to receive signals from GPS satellites 15a to 15d orbiting the Earth on specific orbits.

These GPS satellites 15a to 15d are simply one example of positioning system satellites.

As shown in FIG. 2 the GPS wristwatch 10 has an internal timekeeping unit and a GPS unit, and is arranged to function as a computer.

More specifically, the timekeeping unit in this embodiment of the invention renders an electronic timepiece.

The arrangement shown in FIG. 2 is further described below.

As shown in FIG. 2 the GPS wristwatch 10 has a bus 16 to which are connected a CPU 17, RAM 18, ROM 19, and other devices.

Also connected to the bus 16 is a positioning unit, which in this aspect of the invention is a GPS receiver by way of example. More specifically, the antenna 11, a filter (SAW) 20, RF unit 21, and baseband unit 22 are connected to the bus 16.

Signals received from the GPS satellites 15a to 15d shown in FIG. 1 are thus passed from the antenna 11 through the filter (SAW) 20 and RF unit 21 and extracted by the baseband unit 22 as the GPS signal.

The signals received from the GPS satellites 15a to 15d are described in further detail below.

A timekeeping unit is also connected to the bus 16. More specifically, a real-time clock (RTC) 23 and temperature-compensated crystal oscillator (TCXO) 24 are connected as the timekeeping unit.

The display 14 shown in FIG. 1 is also connected to the bus 16.

The bus 16 is thus an internal bus with the addresses and data paths needed to connect all of the other requisite devices.

The RAM 18 is working memory used by the CPU 17 to execute programs and control the ROM 19 and other devices connected to the bus 16. The ROM 19 stores the programs and other data.

The GPS unit is an example of a receiver for receiving navigation messages transmitted from positioning satellites such as the GPS satellites 15a to 15d.

The operating unit 27 is also connected to the bus 16 for accepting input from the user.

Figure 3:
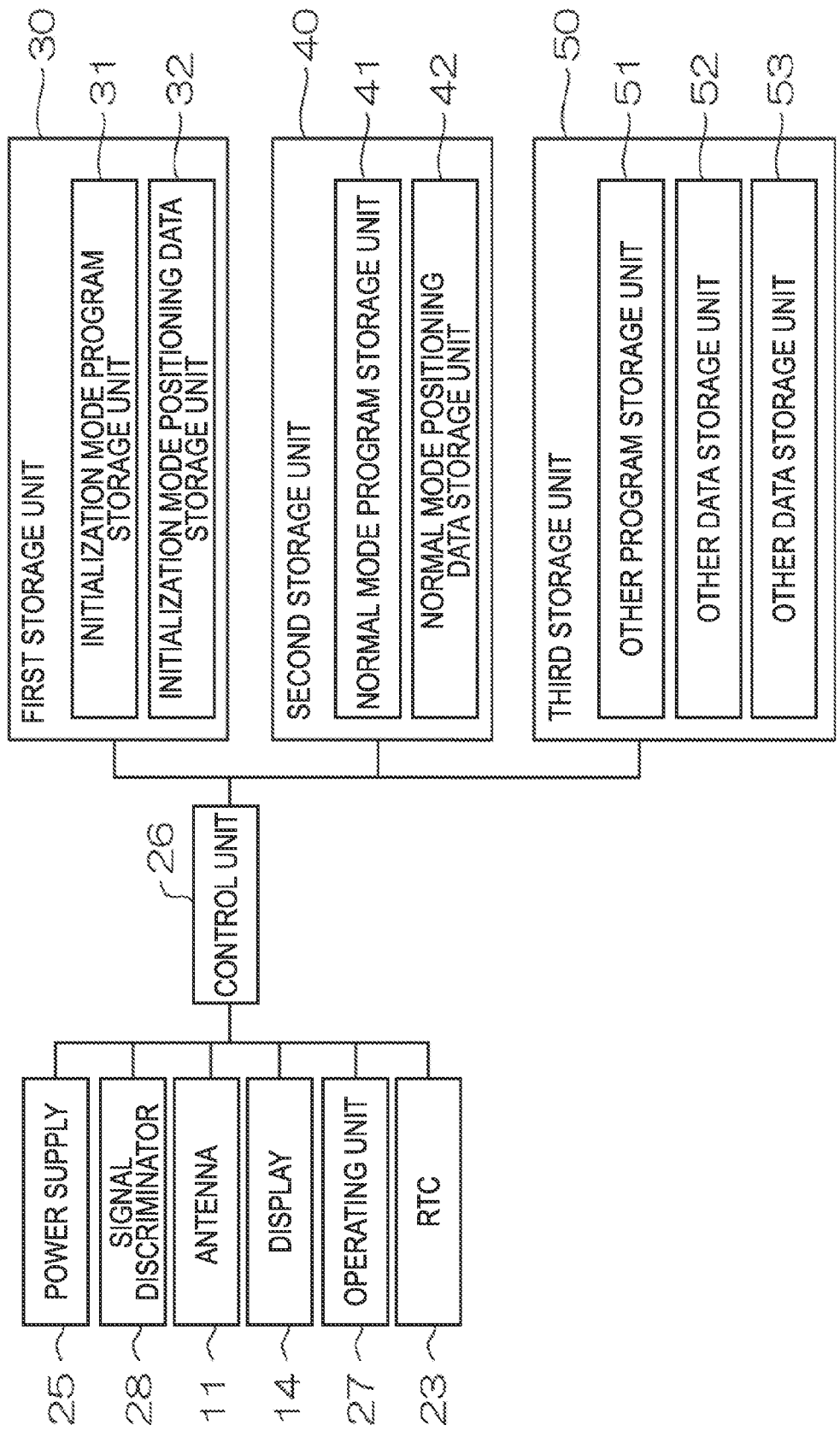
FIG. 3 is a block diagram showing the basic software arrangement of the GPS wristwatch of the invention.

FIG. 3 to FIG. 6 are block diagrams showing the basic software structure of the GPS wristwatch 10, FIG. 3 being an overview.

As shown in FIG. 3 the GPS wristwatch 10 has a control unit 26 that controls overall operation. Connected to the control unit 26 are a power supply 25, the antenna 11, the display 14, the operating unit 27, the real-time clock (RTC) 23, and the other devices shown in FIG. 2. While not shown in FIG. 2, a signal discriminator 28 for generating a signal controlling the power output of the power supply 25 is also connected to the control unit 26. This signal discriminator 28 is a PLL circuit or counter, for example, disposed to the baseband unit 22 shown in FIG. 2. The control unit 26 runs the programs and processes the data stored in the first storage unit 30, the second storage unit 40, and the third storage unit 50.

FIG. 3 to FIG. 6 show the programs, data storage units storing preset data, and data storage units storing data after processing by the programs as being respectively stored in the first storage unit 30, the second storage unit 40, and the third storage unit 50. However, these programs and data are not necessarily stored separately as shown in the figures, and the programs, data storage units storing preset data, and data storage units storing data after processing by the programs are not necessarily rendered separately but are shown this way for simplicity.

Figure 4:
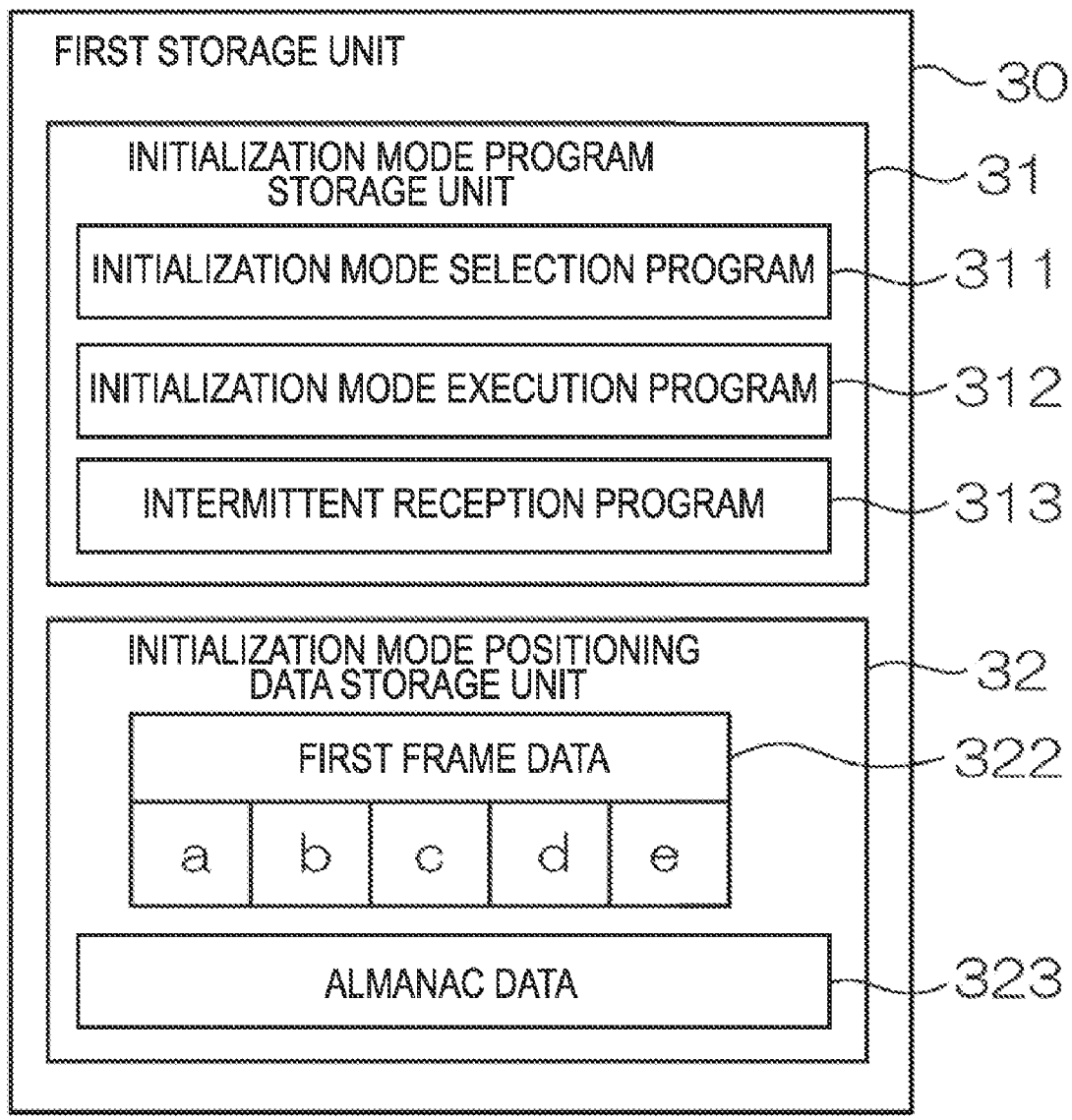
FIG. 4 is a block diagram of the first storage unit shown in FIG. 3.

FIG. 4 is a block diagram showing the internal arrangement of the first storage unit 30 shown in FIG. 3. As shown in FIG. 3, the first storage unit 30 has a initialization mode program storage unit 31 and a initialization mode positioning data storage unit 32. As shown in FIG. 4, a initialization mode selection program 311, a initialization mode execution program 312, and an intermittent reception program 313 are stored in the initialization mode program storage unit 31, and the first frame data 322 and the almanac data 323 that are acquired by the initialization mode execution program 312 and the intermittent reception program 313 are stored in the initialization mode positioning data storage unit 32. The subframe data in the first frame data 322 is stored to areas a to e.

The almanac data 323 shown in FIG. 4 includes all of the almanac data contained in the navigation message except for the almanac data in the first data frame 322 of the navigation message. The data 322, 323 stored in the initialization mode positioning data storage unit 32 is overwritten by the positioning data acquired in the initialization mode the next time the programs in the initialization mode program storage unit 31 run. The data 322, 323 in the initialization mode positioning data storage unit 32 is therefore kept until the positioning data is acquired in the initialization mode the next time the programs in the initialization mode program storage unit 31 run. The programs in the initialization mode program storage unit 31 are run, for example, the first time the power is turned on after the GPS wristwatch 10 is purchased or when the power is turned on again after being turned and left off for several months after the positioning data is first acquired.

Figure 5:
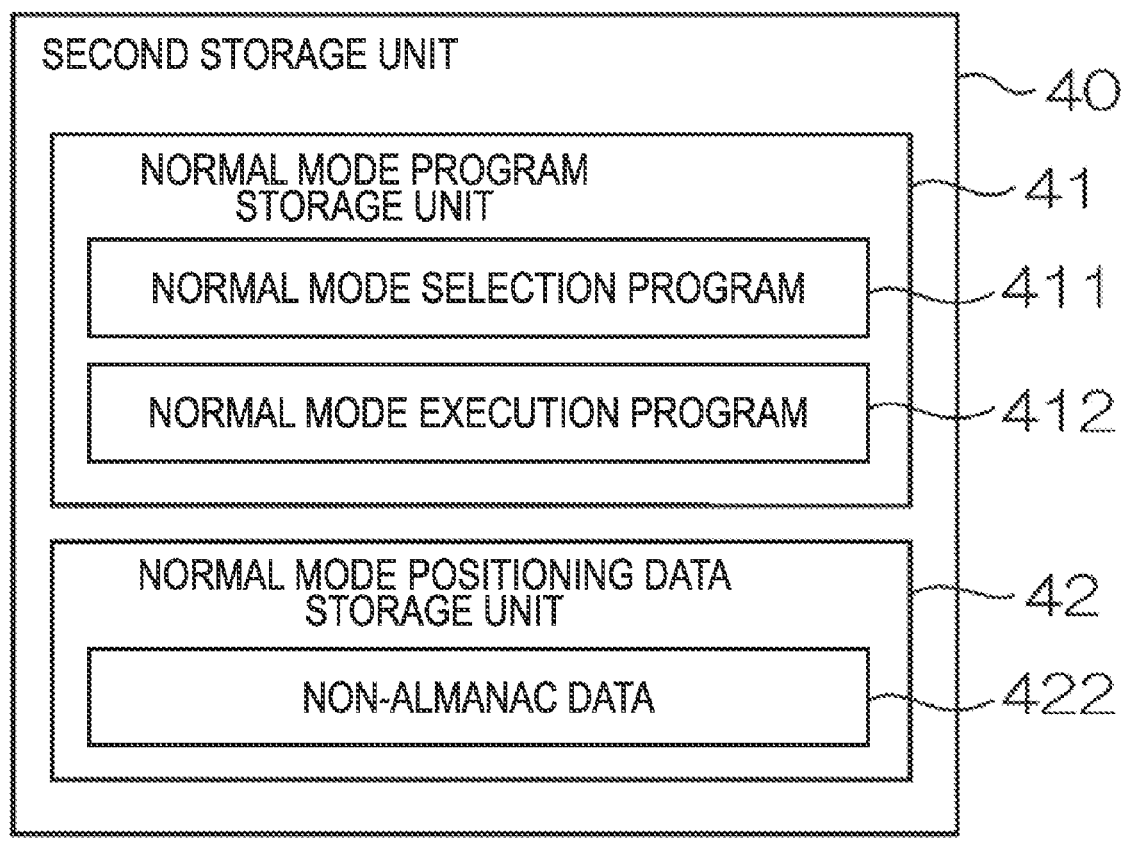
FIG. 5 is a block diagram of the second storage unit shown in FIG. 3.
Figure 12A:
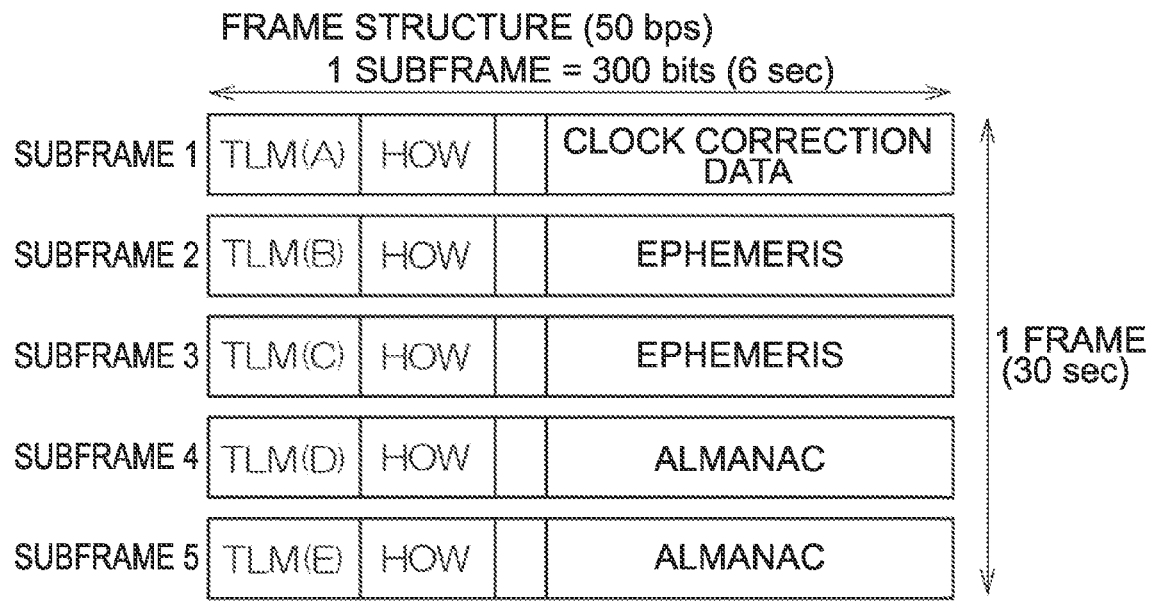
FIGS. 12A and 12B illustrate the structure of the GPS satellite signal.

FIG. 5 is a block diagram showing the internal arrangement of the second storage unit 40 shown in FIG. 3. As shown in FIG. 3 the second storage unit 40 has a normal mode program storage unit 41 and a normal mode positioning data storage unit 42. As shown in FIG. 5, a normal mode selection program 411 and a normal mode execution program 412 are stored in the normal mode program storage unit 41, and non-almanac data 422 is stored in the normal mode positioning data storage unit 42. The non-almanac data 422 includes the data in the subframes other than the subframes containing the almanac data in the navigation messages transmitted from the GPS satellites. More specifically, the navigation message carries information about the health and status of the GPS satellite that is transmitting the navigation message (called "satellite correction data" below) and ephemeris describing the precise orbit of the transmitting satellite in subframes 1 to 3, and the data in the non-almanac data 422 is the data from subframes 1 to 3 as shown in FIG. 12A.

The subframe data in the non-almanac data 422 is unique to a particular GPS satellite. The programs stored in the normal mode program storage unit 41 are therefore run at a regular interval to acquire the subframes containing the satellite correction data and emphemeris, and this subframe data overwrites the non-almanac data 422 stored in the normal mode positioning data storage unit 42.

Figure 6:
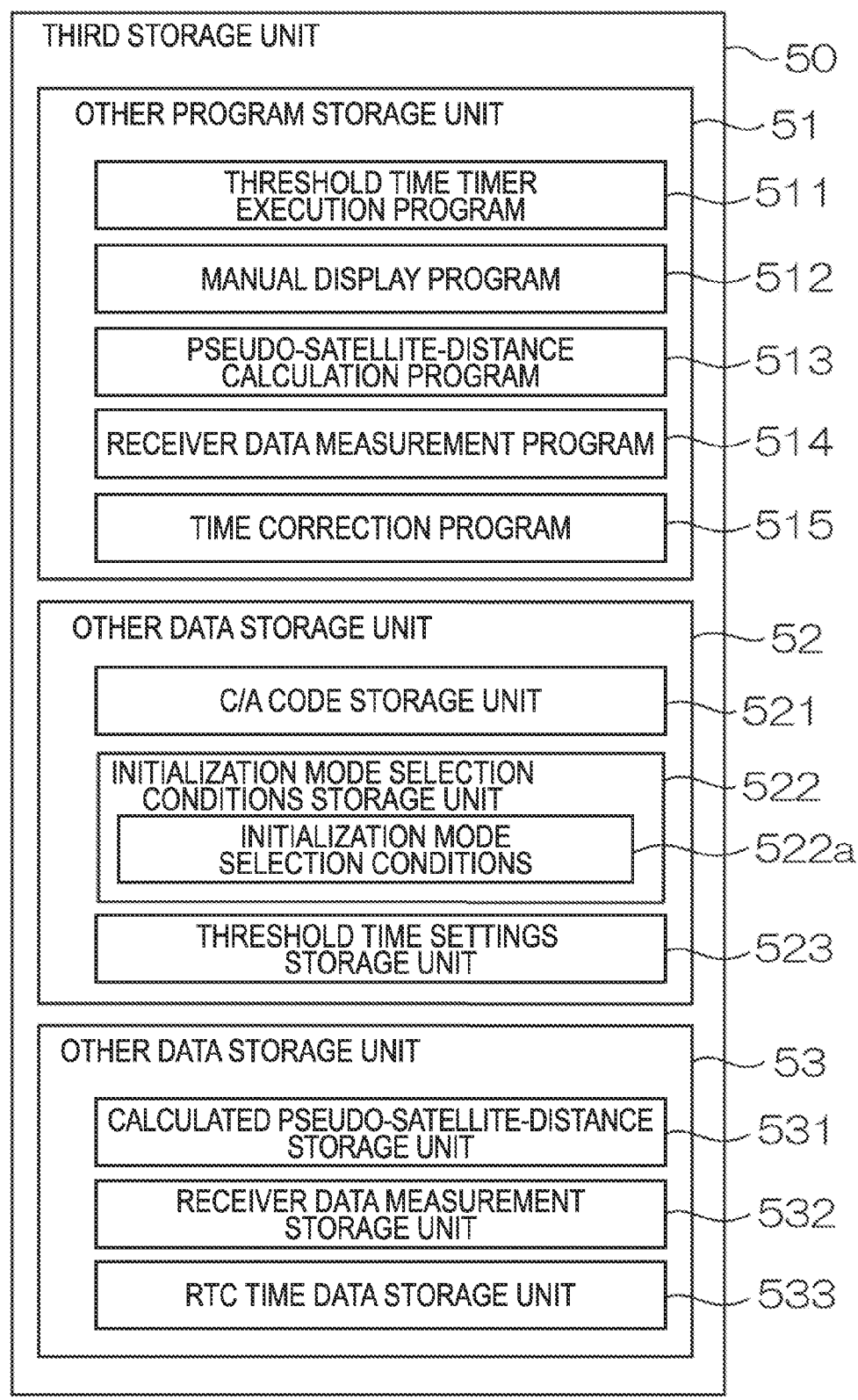
FIG. 6 is a block diagram of the third storage unit shown in FIG. 3.

FIG. 6 is a block diagram showing the internal arrangement of the third storage unit 50 shown in FIG. 3. As shown in FIG. 3 the third storage unit 50 has another program storage unit 51, another data storage unit 52, and an other data storage unit 53.

The other program storage unit 51 stores satellite signal capture programs that are run when executing the programs stored in the initialization mode program storage unit 31 and the normal mode program storage unit 41, and programs for correcting the internal clock of the GPS wristwatch 10 based on time information carried in the navigation message transmitted from the GPS satellite.

The other data storage unit 52 stores data that is required when running the programs stored in the initialization mode program storage unit 31 and the normal mode program storage unit 41. The data stored in the other data storage unit 52 includes preset data stored in a C/A code storage unit 521 and initialization mode selection conditions storage unit 522, and data that can be overwritten by the user in a threshold time settings storage unit 523.

The other data storage unit 53 stores data resulting from running the programs stored in the initialization mode program storage unit 31, the normal mode program storage unit 41, and the other program storage unit 51.

FIG. 7 to FIG. 10 are flow charts describing the main steps in the operation of the GPS wristwatch 10.

The programs and data shown in FIG. 3 to FIG. 6 are described in further detail below while describing the operation of the GPS wristwatch 10 according to this embodiment of the invention with reference to the flow charts in FIG. 7 to FIG. 10.

In order to set the time kept by the real-time clock (RTC) 23 (timekeeping unit) of the GPS wristwatch 10, the user first turns the GPS wristwatch 10 power on. This causes the GPS wristwatch 10 to run the initialization step ST1 shown in FIG. 7 so that the initialization mode selection program 311 in the initialization mode program storage unit 31 shown in FIG. 4 executes to select the initialization mode selection conditions 522a in the initialization mode selection conditions storage unit 522 in the other data storage unit 52 shown in FIG. 6.

The initialization mode selection conditions 522a in this aspect of the invention are: when data has not yet been stored in the initialization mode positioning data storage unit 32 of the GPS wristwatch 10, such as when the power is turned on the first time after the GPS wristwatch 10 is purchased; when data is stored in the initialization mode positioning data storage unit 32 but the normal processing mode in step ST7 does not end and the time cannot be corrected because, for example, several months have passed since the initialization mode positioning data was acquired or the power has been off for several months; or the user asserts a command for manual initialization in step ST9.

Figure 7:
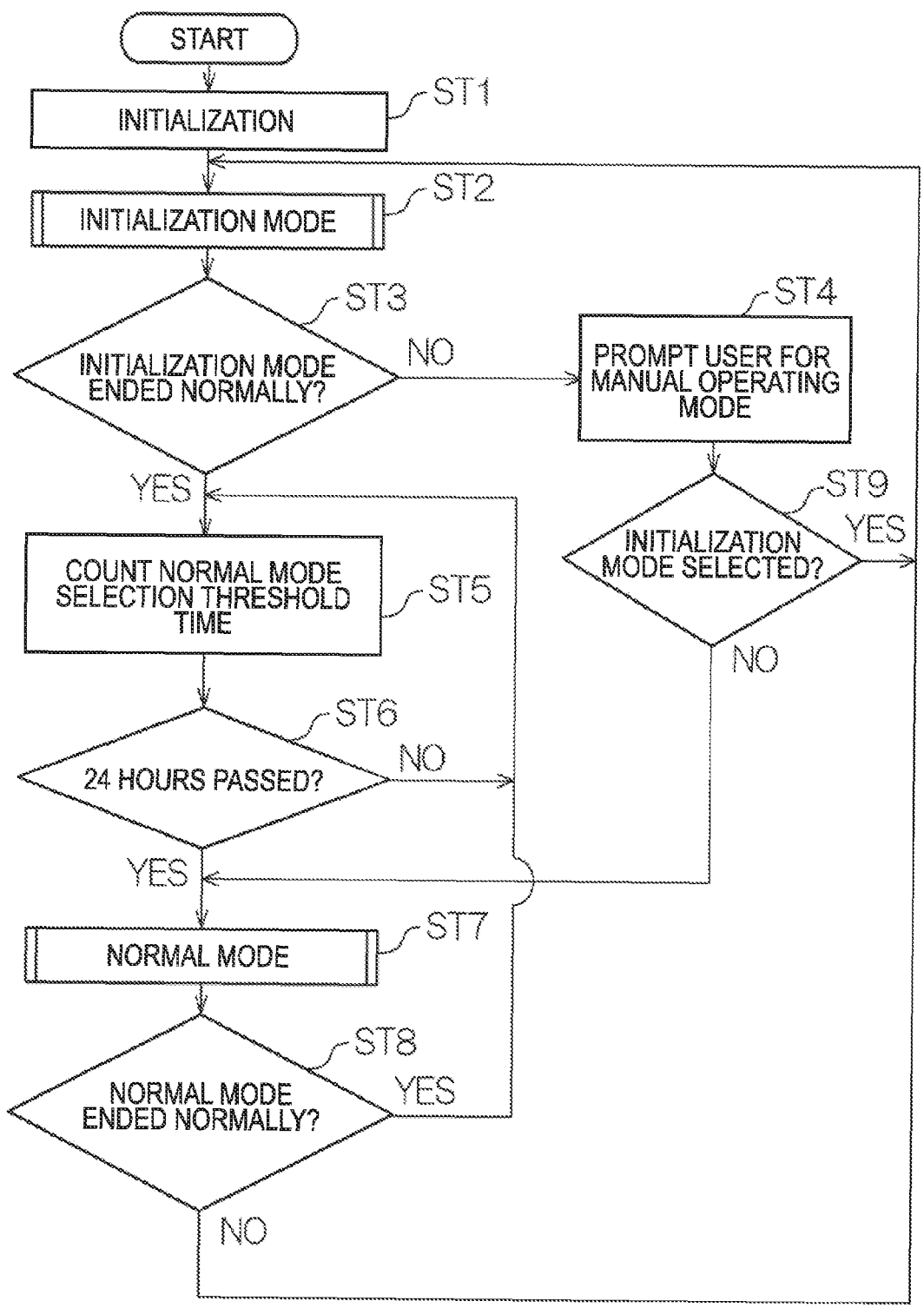
FIG. 7 is a flow chart describing the operation of the GPS wristwatch according to a preferred embodiment of the invention.

Step ST2 in FIG. 7 executes next.

Figure 8:
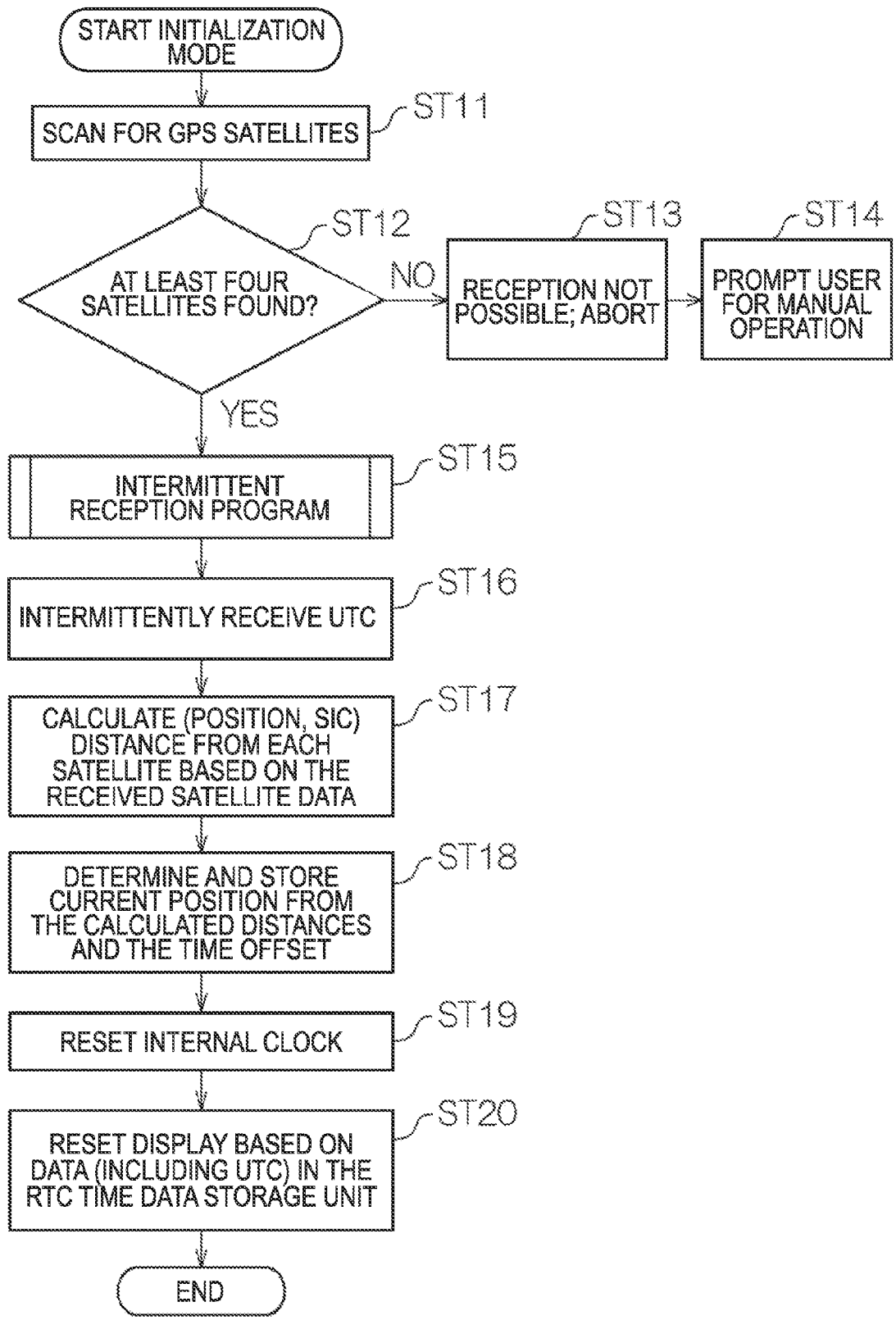
FIG. 8 is a flow chart of the initialization mode executed in step ST2 in FIG. 7.

FIG. 8 is a flow chart of the initialization mode execution step ST2 shown in FIG. 7.

Figure 10:
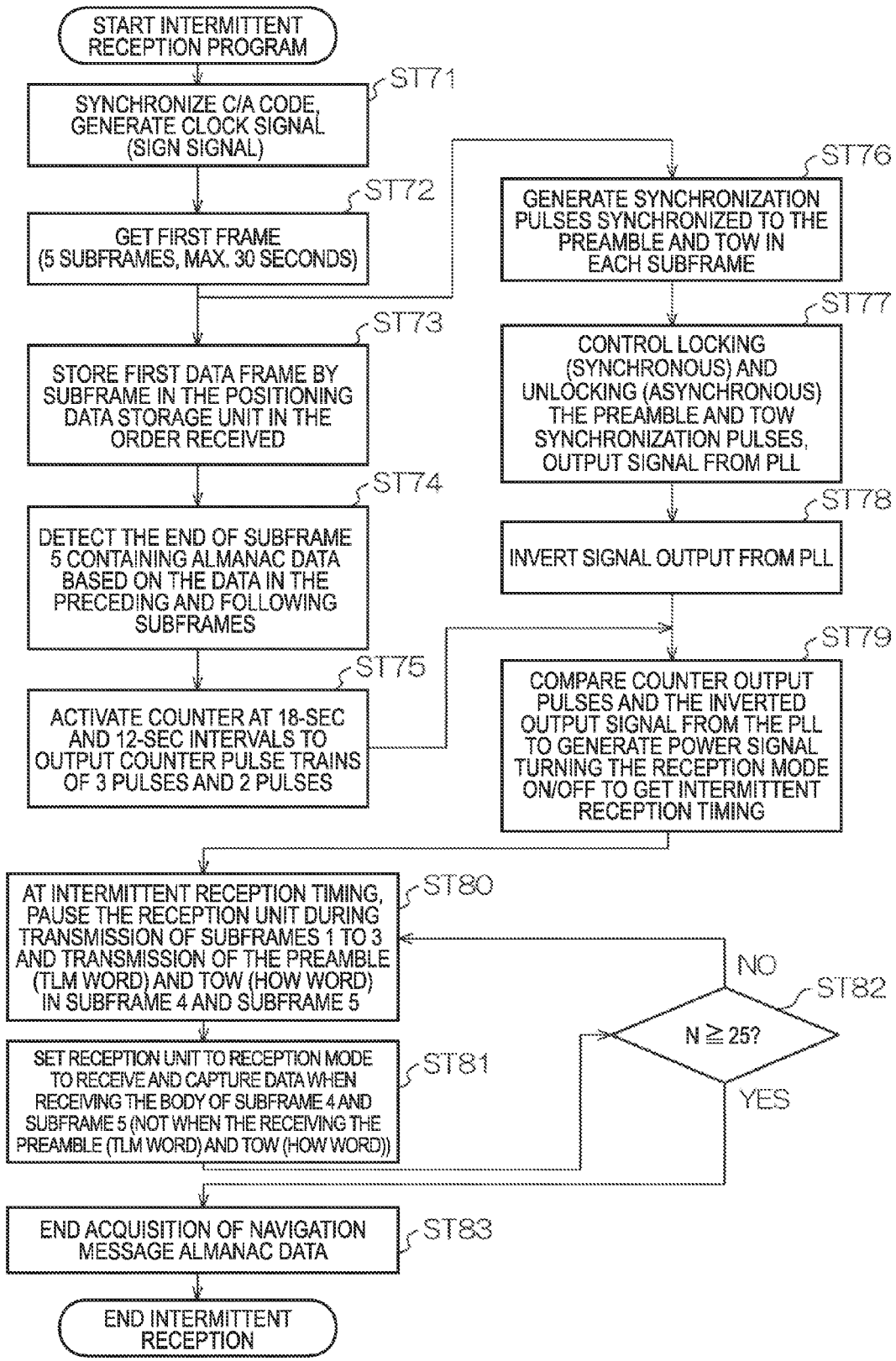
FIG. 10 is a flow chart of the intermittent reception timing program executed in step ST15 in FIG. 8.

FIG. 10 is a flow chart of the intermittent reception program executed in step ST15 in FIG. 8.

Figure 11:
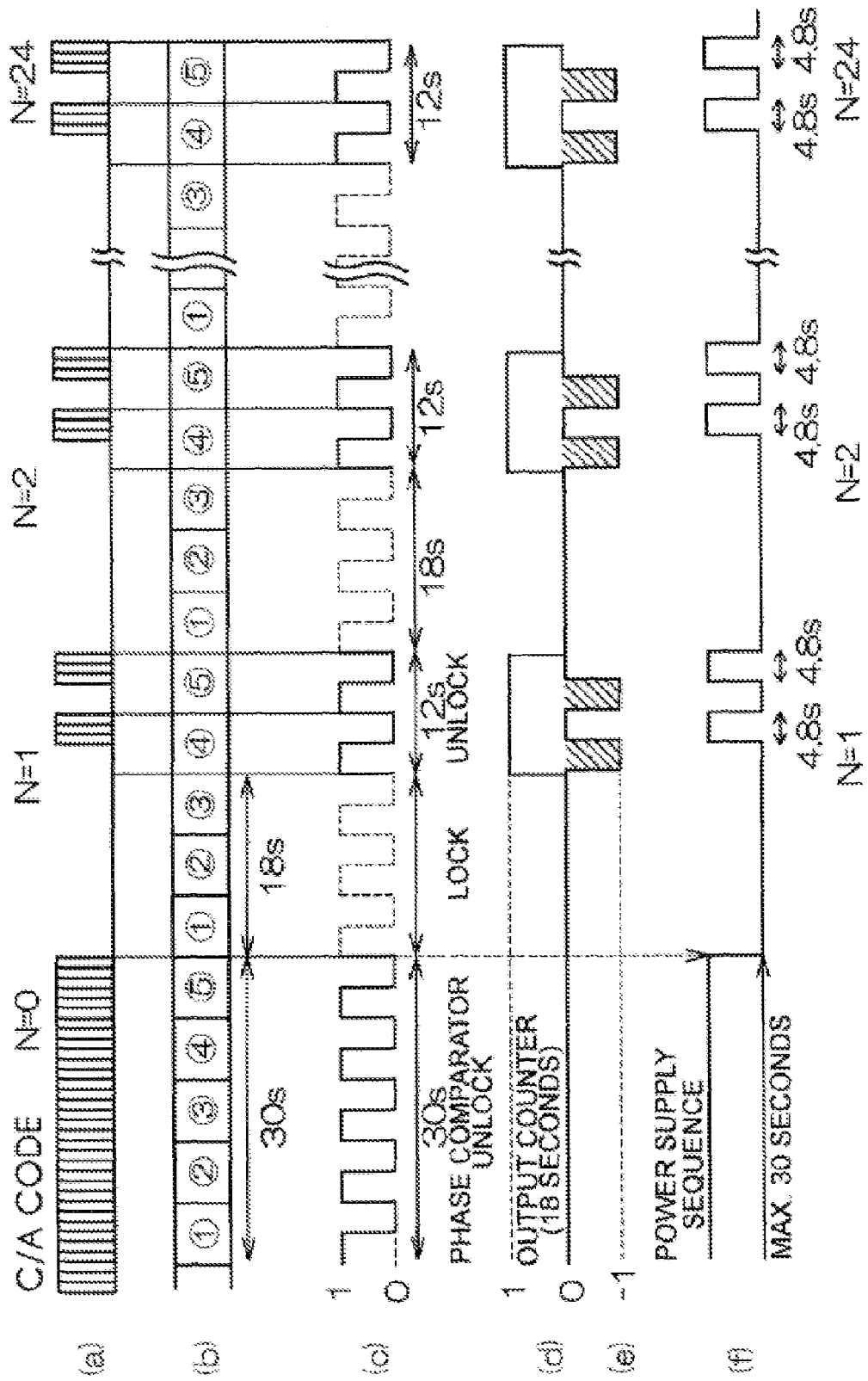
FIG. 11 is a timing chart of the intermittent reception timing program shown in FIG. 10.

FIG. 11 describes the operation of the intermittent reception program in FIG. 10. FIG. 11 (a) represents the C/A code, (b) shows the subframes of the navigation message transmitted from the GPS satellite, (c) shows the output signal after controlling the telemetry word TLM and handover word HOW (preamble and time of week TOW synchronization pulse) output from the PLL circuit with a phase comparator and locking (synchronizing) subframes 1 to 3, (d) shows the output pulse of the counter, (e) is the inversion of the output signal shown in (c), and (f) shows the power supply signal waveform output from a signal discriminator linked to the power supply 25 shown in FIG. 3. These signals (a) to (f) are referenced to the same time base in FIG. 11.

The almanac data containing orbital information for all satellites is intermittently received primarily in the initialization mode as described below with reference to FIG. 8, FIG. 10, and FIG. 11.

The initialization mode starts by scanning for a GPS satellite 15a in step ST11 in FIG. 8. More specifically, the GPS unit shown in FIG. 2 operates to receive transmissions from the GPS satellites 15a through the antenna 11 and search for the GPS satellites 15a from which signals can be captured.

If signals from at least four GPS satellites 15a can be captured (step ST12 returns Yes), control goes to step ST15. If signals from at least four GPS satellites 15a cannot be captured (step ST12 returns No), control goes to step ST13. Step ST13 determines that reception is not possible because the GPS satellite signals cannot be detected. A message instructing the user to proceed with manual operation is then presented on the display 14 shown in FIG. 1 and FIG. 2 (step ST14), and the GPS signal reception mode is turned off.

Step ST15 runs the intermittent reception program 313 shown in FIG. 4 to receive signals from the captured GPS satellites 15a. The intermittent reception program 313 shown in FIG. 4 proceeds as shown in the flow chart in FIG. 10. The intermittent reception program 313 is run by the control unit 26 in conjunction with the signal discriminator 28 shown in FIG. 3.

The structure of the GPS signals transmitted from each of the GPS satellite 15a is shown in FIG. 12A and described below.

As shown in FIG. 12A, each GPS satellite 15a transmits signals in data frame units and transmits one frame every 30 seconds. Each frame consists of five subframes, and one subframe is transmitted every 6 seconds. Each subframe contains 10 words (1 word is 0.6 second).

Figure 12B:
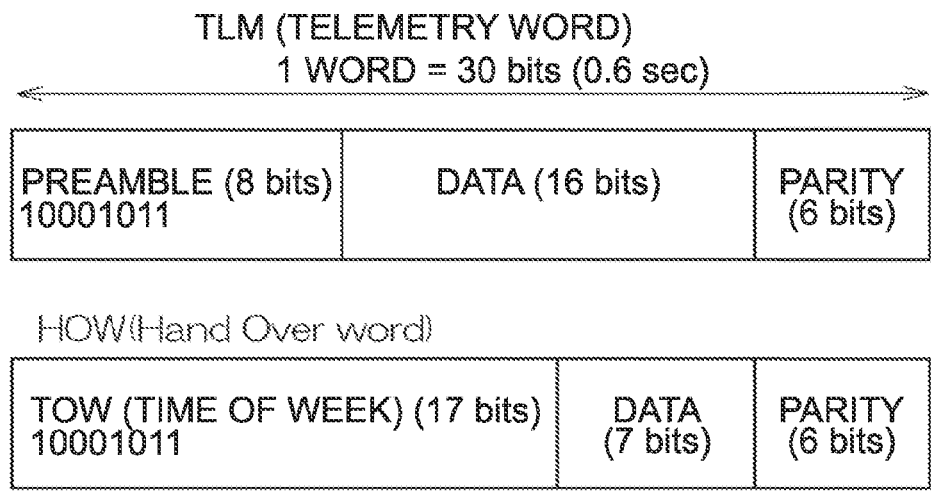
Figure 13:
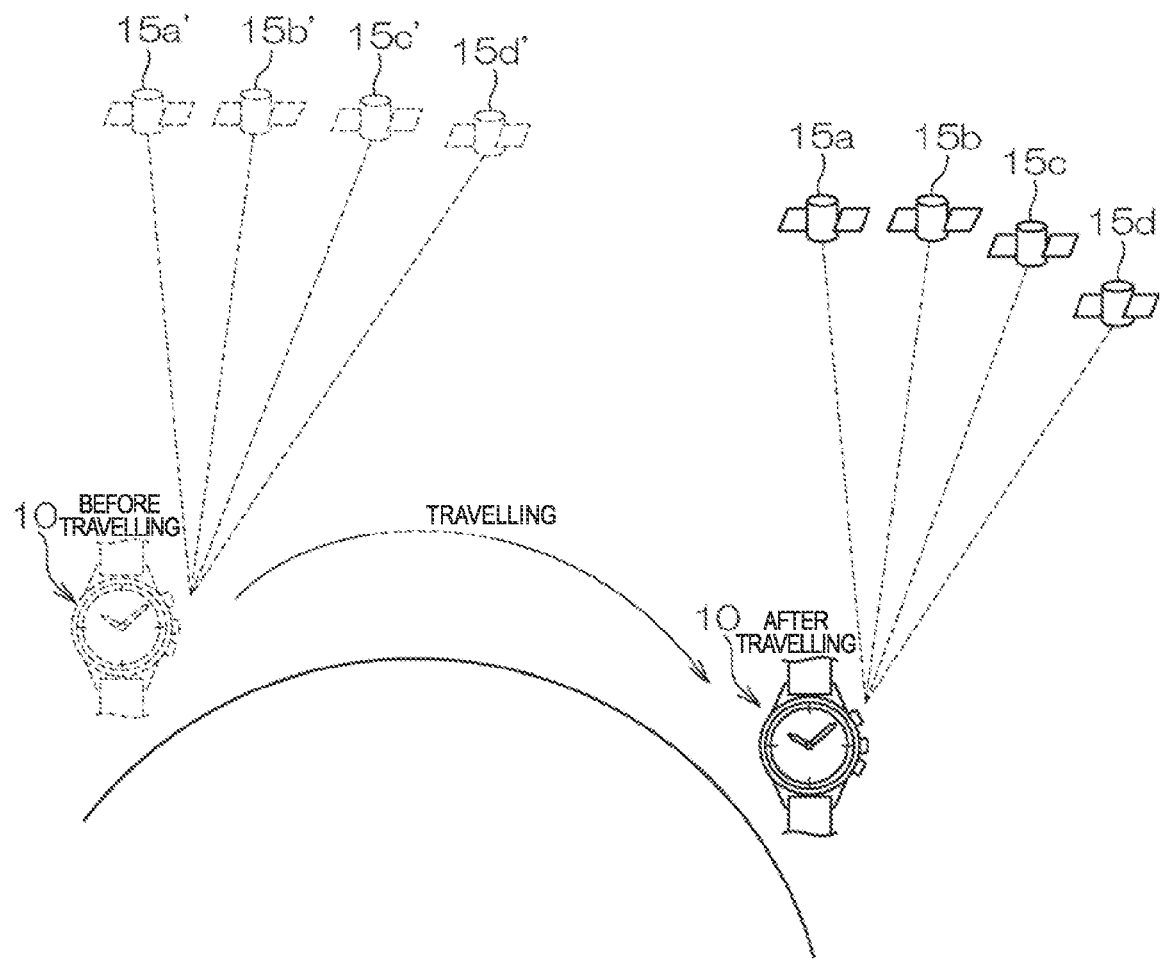
FIG. 13 describes the use of a GPS wristwatch in one scenario.

The first word in each subframe is a telemetry (TLM) word, and each TLM word starts with a preamble as shown in FIG. 12B.

The TLM word is followed by a handover word HOW, and each HOW starts with the time of week TOW indicating the GPS time information of the GPS satellite.

The GPS time is the number of seconds since 00:00:00 Sunday night, and is reset to zero at precisely 00:00:00 every Sunday night. The same GPS week number is added to the GPS time throughout the week, and the GPS receiver can therefore get the precise GPS time by reading the week number and the elapsed time (number of seconds). The GPS time is referenced to the Coordinated Universal Time (UTC).

The receiver must synchronize with the signal from the GPS satellite 15a in order to receive the frame data from a particular GPS satellite 15a, and the C/A code is used for synchronization with 1 ms precision. The C/A code is a 1023-chip pseudo random noise code that repeats every 1 ms.

Signals from the GPS satellites 15a are transmitted as described above. As a result, this embodiment of the invention is phase synchronized with the C/A code from each selected GPS satellite 15a and generates a clock signal (sign signal) in step ST71 in FIG. 10. The GPS receiver uses the data in the C/A code storage unit 521 shown in FIG. 6 for phase synchronization with the C/A code from each GPS satellite 15a and thereby synchronize with the GPS satellite 15a signal.

Control then goes to step ST72 to synchronize with the preamble of the TLM word and the TOW in the HOW word shown in FIG. 12B. As shown in FIG. 12A, the data in each subframe, including the ephemeris (precise orbital information for a particular GPS satellite 15a) and the almanac (orbital information for all GPS satellites 15a) and the UTC, is received to acquire the data for the first frame. Receiving the first frame takes 30 seconds.

The frame and subframes shown in FIG. 12 show an example of a specific unit of a satellite signal in which the TOW is an example of the time information of a positioning information satellite (such as a GPS satellite 15a) and the TLM and HOW words are examples of time-related information units, and the names of the parts where the ephemeris and almanac data are stored are examples of the time and other transmission information units.

In step ST73 the data acquired in step ST72 is stored sequentially by subframe unit to the first frame data 322 storage areas a to e in the initialization mode positioning data storage unit 32 shown in FIG. 4.

Control then goes to step ST74. As shown in FIG. 12B, the subframe data includes the preamble of the TLM word and the TOW in the HOW word, and this data is common to each subframe. By using this common data to compare each subframe, the end of the subframe 5 containing the almanac data portion of the frame data can be detected from the subframe data stored in areas a to e of the first data frame 322 acquired in step ST73. A counter N is initialized to 0 when the first data frame is received, is then incremented to N=N+1 whenever the end of subframe 5 is detected, and reception continues until N≧power supply 25 when control then goes to step ST83.

Control goes from step ST74 to ST75 and a counter pulse is output from a counter (not shown in the figure) set in the baseband unit 22 shown in FIG. 2 at alternating 18 second and 12 second intervals. These 18 second and 12 second intervals are equal to the transmission time required to receive subframes 1 to 3 and subframes 4 and 5, respectively, of the navigation message transmitted form the GPS satellite 15a. As shown in FIG. 11(d), the counter pulse is a rectangular wave that alternates between 0 and 1 where 0 is the base, outputs 0 for 18 seconds from the end of subframe 5, then outputs 1 for 12 seconds, and then repeats.

Step ST76 synchronizes the preamble and then the TOW word based on the subframe data acquired in step ST72, and outputs the synchronization pulses.

As indicated by the solid line in FIG. 11(c), the synchronization pulses are rectangular wave pulses that alternate between 1 and 0 during the 6 second period required to transmit the data for each subframe. More specifically, the synchronization pulses are rectangular wave pulses that go to 1 for the time required to transmit the TLM and HOW words containing the preamble and TOW data (that is, for 1.2 second from the beginning of the subframe) and then go to 0 for the time required to transmit the remaining subframe data (that is, for 4.8 seconds).

In step ST77, the signals output in step ST76 are input to the phase comparator of the PLL circuit in the baseband unit 22 shown in FIG. 2. This phase comparator controls the locked (synchronous) and unlocked (asynchronous) phases, and the signals are output from the PLL circuit after locking/unlocking control. The resulting synchronization signal is shown in FIG. 11(c) where the solid line denotes the unlocked phase corresponding to the subframe 4 and subframe 5 transmission time, and the dotted line denotes the locked phase corresponding to the subframe 1 to subframe 3 transmission time. This locked/unlocked control time is based on the clock signal (sign signal) acquired by synchronization with the C/A code.

In step ST78 the sign of the output signal acquired from the PLL circuit in step ST77 is inverted. As shown schematically in FIG. 11(e), inverting the sign changes the signal levels of 1 and 0 described in FIG. 11(c) to −1 and 0, and produces a replica of the signal (rectangular wave pulse) shown in FIG. 11(c).

Step ST79 compares the counter pulse signal output in step ST75 and the inverted signal output from the PLL circuit in step ST78 to acquire the reception mode/pause mode power signal shown in FIG. 11(f) controlling the intermittent reception timing. The power supply sequence in FIG. 11(f) shows enabling the reception mode during the transmission of the data other than the TLM and HOW words in subframe 4 and subframe 5, and entering the pause mode during transmission of subframes 1 to 3 and during transmission of the TLM and HOW words in subframe 4 and subframe 5. This power supply wave controls the power supply 25 shown in FIG. 2 and FIG. 3 to receive only the required portions of the navigation message from the GPS satellite 15a through the antenna 11. While data spread across 25 pages must be received in order to receive the entire almanac transmitted in the navigation message, the invention can accurately receive the almanac without receiving the TLM and HOW words in subframe 4 and subframe 5 and can also reduce power consumption by controlling switching between the reception mode and the pause mode, that is, turning the reception mode on and off.

The almanac can also be accurately acquired because a clock signal (sign signal) is created synchronized to the C/A code in the received navigation message and the signals shown in FIG. 11(a) to (f) are controlled by this clock signal.

Furthermore, because power consumption is reduced without dividing almanac reception over different days, the positioning device of the invention can be easily incorporated into small devices such as a wristwatch.

At the intermittent reception timing of the power supply signal shown in FIG. 11(f) and acquired in step ST79, steps ST80, ST81, and ST82 get the subframe 4 and subframe 5 data other than the TLM and HOW word portions and store the acquired data as the almanac data 323 shown in FIG. 4.

Steps ST80 to ST82 repeat until all almanac data in the navigation message transmitted from the GPS satellite 15a is acquired. When all almanac data has been received, step ST83 ends the intermittent reception program.

Control then goes to step ST16 in FIG. 8 to get the UTC data by intermittent reception. In step ST17 the GPS wristwatch 10 then measures the pseudo-satellite-distance from each satellite based on the data acquired from each satellite. More specifically, the pseudo-satellite-distance calculation program 513 shown in FIG. 6 measures the signal transmission time from each of the GPS satellites 15a (the time it took the signals to travel from the GPS satellite to the GPS wristwatch 10) using the internal real-time clock (RTC) 23, and based on this transmission time and the speed of light (the speed of electromagnetic wave transmission: c) calculates the distance between the GPS wristwatch 10 and each of the four GPS satellites 15a from which the emphemeris was received. The calculated data is then stored in the calculated pseudo-satellite-distance storage unit 531 shown in FIG. 6. This data is rewritable and the satellite distance is also calculated in the normal processing mode. The data calculated at this time is stored in the calculated pseudo-satellite-distance storage unit 531 shown in FIG. 6 and is overwritten after a specific period of time.

The receiver data measurement program 514 shown in FIG. 6 is then executed in step ST18 to calculate the position and altitude of the GPS wristwatch 10 and the true signal transmission delay time in four simultaneous equations based on the pseudo-satellite-distance calculated for each of the four GPS satellites, and thereby calculate the position and altitude of the GPS wristwatch 10 and the true signal transmission delay time. This provides the true transmission delay time and the transmission delay time measured by the real-time clock (RTC) 23. This data is then stored in the receiver data measurement storage unit 532 shown in FIG. 6. The data stored in the receiver data measurement storage unit 532 is also measured when the normal processing mode described below executes, and is overwritten after a prescribed amount of time.

The receiver data measurement program 514 shown in FIG. 6 then generates and stores in the receiver data measurement storage unit 532 the time required to receive the signals transmitted from the four GPS satellites 15a referenced to the actually measured transmission delay time, the calculated true transmission delay time and the position of the GPS wristwatch 10, and the transmission delay time as measured by the real-time clock (RTC) 23.

The determined position is then stored as the positioning data in the receiver data measurement storage unit 532 shown in FIG. 6. The difference (the offset time) between the true transmission delay time calculated in step ST18 and the transmission delay time measured by the real-time clock (RTC) 23 is also stored in the receiver data measurement storage unit 532.

The time correction program 515 shown in FIG. 6 then runs in step ST19 to offset (adjust) the RTC time data stored in the RTC time data storage unit 533 based on the offset time stored in the receiver data measurement storage unit 532. As described above, the offset time is the difference between the true transmission delay time and the transmission delay time measured by the real-time clock (RTC) 23.

Based on the current position of the GPS wristwatch 10 and the offset time determined using the pseudo-satellite-distances calculated from the navigation messages received from each of the GPS satellite 15a, the time correction program 515 thus adjusts the RTC time data of the internal clock based on the offset time. UTC data is also stored in the RTC time data storage unit 533 shown in FIG. 6 in addition to the RTC time data.

Next, as shown in step ST20, the display on the dial 12 is adjusted based on the RTC time data storage unit 533 shown in FIG. 6, which includes the UTC reference data acquired from the GPS satellites 15a. The time at the current location, such as Japanese Standard Time, is thus displayed on the dial 12 to reflect the time difference.

Referring again to the flow chart in FIG. 7, step ST3 determines if the initialization mode ended normally. If it did not end normally (step ST3 returns No), control goes to step ST4 and the manual display program 512 shown in FIG. 6 is run to display a prompt asking the user to manually select the operating mode.

If the user selected the initialization mode in step ST9, control loops back to step ST2 in FIG. 7. If the initialization mode is not selected, control goes to step ST7 and the normal processing mode executes. This initialization mode selection condition is one of the initialization mode selection conditions 522a stored in the initialization mode selection conditions storage unit 522 shown in FIG. 6.

If the initialization mode terminates normally (step ST3 returns Yes), control goes to step ST5. In step ST5 the threshold time setting, which is the normal mode selection threshold time (such as 24 hours), stored in the threshold time settings storage unit 523 shown in FIG. 6 is read and then counted by the threshold time timer execution program 511. Step ST6 then determines if 24 hours have passed. If 24 hours have passed, control goes to step ST7 and the normal processing mode executes. If 24 hours have not passed, the threshold time timer execution program 511 continues counting and counts until 24 hours have passed. The normal mode selection program 411 shown in FIG. 5 runs when the time counted by the threshold time timer execution program 511 reaches 24 hours, and the normal mode execution program 412 then executes.

Figure 9:
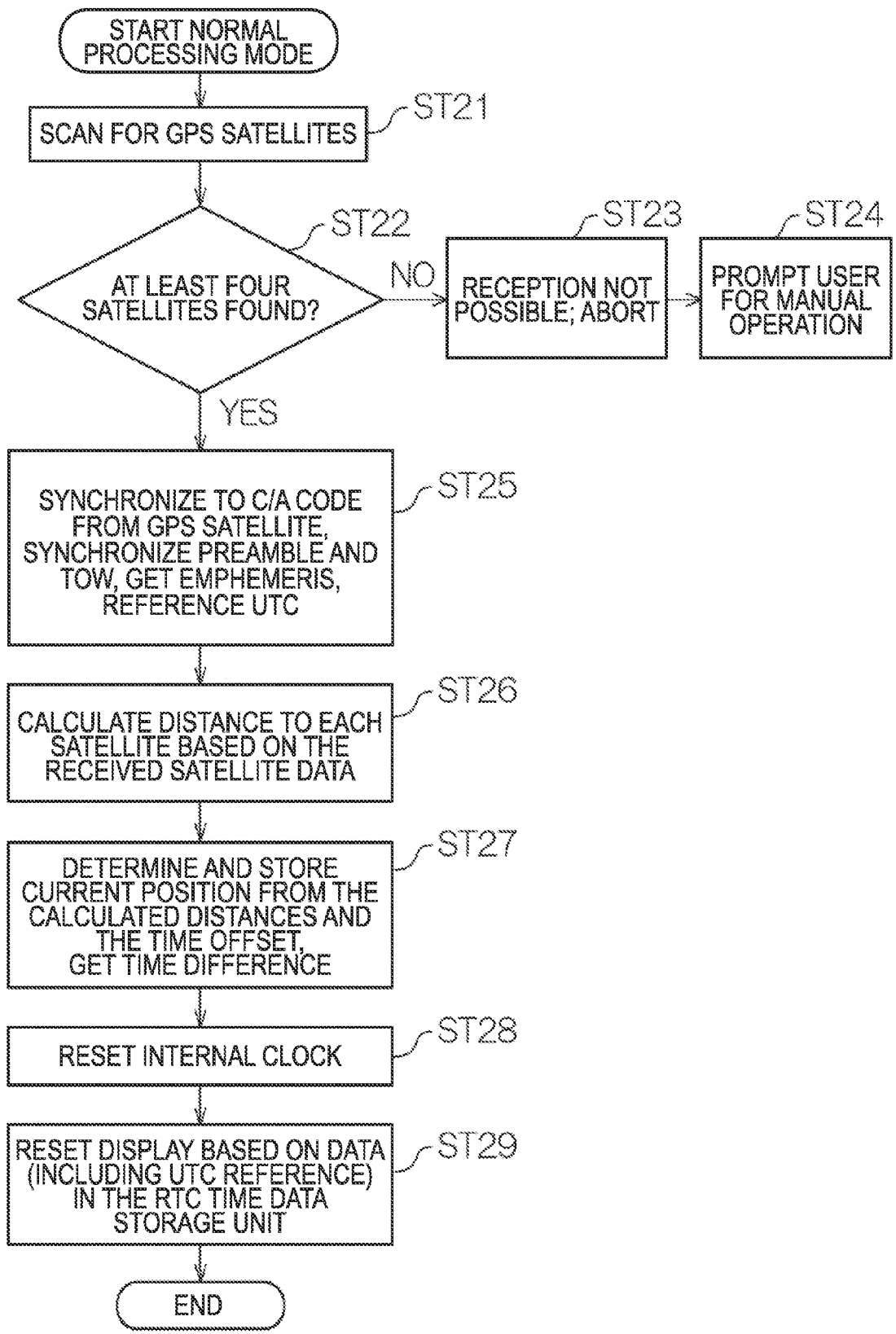
FIG. 9 is a flow chart of the normal processing mode executed in step ST7 in FIG. 7.

FIG. 9 is a flow chart showing the steps of the normal processing mode executed in step ST7 in FIG. 7. Steps ST21 to ST24 in FIG. 9 are the same as steps ST11 to ST14 in FIG. 8, and further description thereof is omitted here. More specifically, the process corresponding to step ST11 in FIG. 8 is step ST21 in FIG. 9, the process corresponding to step ST12 in FIG. 8 is step ST22 in FIG. 9, the process corresponding to step ST13 in FIG. 8 is step ST23 in FIG. 9, and the process corresponding to step ST14 in FIG. 8 is step ST24 in FIG. 9.

If signals from four or more GPS satellites 15a are captured in step ST22, control goes to step ST25. Step ST25 gets the data in the navigation message other than the data acquired in the initialization mode executed in step ST2. In this case the GPS wristwatch 10 first uses the data in the internal C/A code storage unit 521 shown in FIG. 6 to synchronize with the C/A code from a specific GPS satellite 15a. The GPS wristwatch 10 then synchronizes with the preamble of the TLM word and the TOW of the HOW word that are contained in the navigation messages from the GPS satellite 15a. Referring to FIG. 12A, the data other than the almanac data carried in subframe 4 and subframe 5, that is, the ephemeris, UTC code, and clock correction data, are thus read and written to the non-almanac data 422 in the normal mode positioning data storage unit 42 shown in FIG. 5. It is not necessary to read the almanac data at this time because the almanac data was already read in the initialization mode in step ST2 and stored to the initialization mode positioning data storage unit 32. As a result, the normal processing mode only needs to read the data in subframes 1 to 3 in the navigation message from each GPS satellite 15a as shown in FIG. 12A.

More specifically, after synchronizing with the C/A code, the GPS wristwatch 10 operates in the reception mode for only the time needed to synchronize to the preamble of each TLM word and the TOW of each HOW word and capture subframes 1 to 3 (that is, 18 seconds). Power consumption is thereby reduced.

In step ST26 the pseudo-satellite-distance calculation program 513 shown in FIG. 6 calculates the pseudo-satellite-distance for each satellite based on the data stored in the non-almanac data 422 and the data acquired in the initialization mode in step ST2 and stored to the initialization mode positioning data storage unit 32, and writes the calculated distances to the calculated pseudo-satellite-distance storage unit 531.

The pseudo-satellite-distance calculation program 513 calculates the pseudo-satellite-distances using the same method described in step ST17 in FIG. 8.

Control then goes to step ST27 and the receiver data measurement program 514 shown in FIG. 6 runs to calculate the position and altitude of the GPS wristwatch 10 and the true transmission delay time using the method described in step ST18 in FIG. 8. The true transmission delay time and the transmission delay time measured by the real-time clock (RTC) 23 are stored in the receiver data measurement storage unit 532 shown in FIG. 6, overwriting and updating the data acquired in the initialization mode in step ST2.

The receiver data measurement program 514 shown in FIG. 6 then generates and stores in the receiver data measurement storage unit 532 the time required to receive the signals transmitted from the four GPS satellites 15a referenced to the actually measured transmission delay time, the calculated true transmission delay time and the position of the GPS wristwatch 10, and the transmission delay time as measured by the real-time clock (RTC) 23. These values overwrite and update the values acquired in the initialization mode in step ST2.

The determined position is then stored as the positioning data in the receiver data measurement storage unit 532 shown in FIG. 6, overwriting and updating the value acquired in the initialization mode in step ST2. The difference (the offset time) between the true transmission delay time calculated in step ST18 and the transmission delay time measured by the real-time clock (RTC) 23 is also stored in the receiver data measurement storage unit 532, overwriting and updating the value acquired in the initialization mode in step ST2.

The time correction program 515 shown in FIG. 6 then runs in step ST19 to offset (adjust) the RTC time data stored in the RTC time data storage unit 533 based on the offset time stored in the receiver data measurement storage unit 532. As described above, the offset time is the difference between the true transmission delay time and the transmission delay time measured by the real-time clock (RTC) 23.

Based on the current position of the GPS wristwatch 10 and the offset time determined using the pseudo-satellite-distances calculated from the navigation messages received from each of the GPS satellite 15a, the time correction program 515 thus adjusts the RTC time data of the internal clock based on the offset time. UTC data is also stored in the RTC time data storage unit 533 shown in FIG. 6 in addition to the RTC time data.

Next, as shown in step ST20, the display on the dial 12 is adjusted based on the RTC time data storage unit 533 shown in FIG. 6, which includes the UTC reference data acquired from the GPS satellites 15a. The time at the current location, such as Japanese Standard Time, is thus displayed on the dial 12 to reflect the time difference.

If the normal processing mode ends normally, step ST8 in FIG. 7 returns to step ST5 to resume counting the normal mode selection threshold time so that the data is updated every 24 hours.

If the normal processing mode does not end normally, control returns to step ST2, the initialization mode runs, and the new almanac is received.

The invention is described using a GPS wristwatch 10 by way of example, but the method of acquiring the almanac data in the initialization mode according to the present invention can obviously be used in other small devices.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A positioning device that has a reception unit for receiving navigation messages transmitted continuously in a time series from positioning information satellites orbiting the Earth and determines the location of the positioning device based on the navigation messages received by the transmission unit, wherein each navigation message is segmented into a plurality of data transmission blocks that are transmitted sequentially,
a portion of the data transmission blocks carry almanac data containing orbital information for all positioning information satellites including the positioning information satellite transmitting the received navigation message, and
the data transmission blocks carrying the almanac data are transmitted non-contiguously,
the positioning device comprising:
a signal discrimination unit for identifying the start of receiving a data transmission block containing the non-contiguously transmitted almanac data, and identifying the end of receiving the data transmission block containing the almanac data; and
the reception unit intermittently receives the signals of the data transmission blocks containing the almanac data by receiving the navigation messages in the reception time of the data transmission blocks containing the almanac data identified by the signal discrimination unit.

2. The positioning device described in claim 1, wherein:
the signal discrimination unit detects the transmission time of the data transmission block based on a sign signal generated synchronized to the C/A code that is unique to the positioning information satellite, and
identifies the reception start time of a data transmission block containing the almanac data and the reception end time of the data transmission block containing the almanac data based on the sign signal timed to the transmission time.

3. The positioning device described in claim 2, wherein:
the plurality of data transmission blocks is five subframes; and
the signal discrimination unit comprises a control signal unit that outputs a control signal for getting a synchronization signal synchronized to preamble data and TOW data contained in each subframe, and asynchronously acquiring two subframes containing the almanac data based on the sign signal.

4. The positioning device described in claim 3, wherein the five subframes constitute one frame; and
the signal discrimination unit comprises:
a counter that, based on the sign signal and the synchronization signal, detects the end of the fifth subframe, which contains almanac data, in a frame, detects the timing of three subframes and two subframes based using the sign signal, and outputs a counter signal at this timing; and
a signal generating unit that inverts the control signal output from the control signal unit and outputs the inverted control signal, and generates a signal acquired by comparing the inverted control signal and the counter signal.

5. A positioning method that has a reception unit for receiving navigation messages transmitted continuously in a time series from positioning information satellites orbiting the Earth and determines the location of the positioning device based on the navigation messages received by the transmission unit,
wherein each navigation message is segmented into a plurality of data transmission blocks that are transmitted sequentially,
a portion of the data transmission blocks carry almanac data containing orbital information for all positioning information satellites including the positioning information satellite transmitting the received navigation message, and
the data transmission blocks carrying the almanac data are transmitted non-contiguously,
the positioning method comprising:
a signal discrimination unit for identifying the start of receiving a data transmission block containing the non-contiguously transmitted almanac data, and identifying the end of receiving the data transmission block containing the almanac data; and
the reception unit intermittently receives the signals of the data transmission blocks containing the almanac data by receiving the navigation messages in the reception time of the data transmission blocks containing the almanac data identified by the signal discrimination unit.

6. A timepiece comprising:
a positioning device that has a reception unit for receiving navigation messages transmitted continuously in a time series from positioning information satellites orbiting the Earth and determines the location of the positioning device based on the navigation messages received by the transmission unit,
wherein each navigation message is segmented into a plurality of data transmission blocks that are transmitted sequentially,
a portion of the data transmission blocks carry almanac data containing orbital information for all positioning information satellites including the positioning information satellite transmitting the received navigation message, and
the data transmission blocks carrying the almanac data are transmitted non-contiguously; and
a signal discrimination unit for identifying the start of receiving a data transmission block containing the non-contiguously transmitted almanac data, and identifying the end of receiving the data transmission block containing the almanac data;
wherein the reception unit intermittently receives the signals of the data transmission blocks containing the almanac data by receiving the navigation messages in the reception time of the data transmission blocks containing the almanac data identified by the signal discrimination unit.

* * * * *